United States Patent
Crockford et al.

(12)
(10) Patent No.: US 6,630,892 B1
(45) Date of Patent: Oct. 7, 2003

(54) DANGER WARNING SYSTEM

(75) Inventors: Bruce E. Crockford, 35 Travis Park Dr., Sugar Land, TX (US) 77479; Kevin Speller, Houston, TX (US)

(73) Assignee: Bruce E. Crockford, Sugarland, TX (US)

( * ) Notice: Subject to any disclaimer, the term of this patent is extended or adjusted under 35 U.S.C. 154(b) by 0 days.

(21) Appl. No.: 09/140,179

(22) Filed: Aug. 25, 1998

(51) Int. Cl.$^7$ ................................................. G08G 1/00
(52) U.S. Cl. ...................... 340/904; 340/901; 340/905; 340/907; 340/929; 340/436
(58) Field of Search ................................. 340/901, 902, 340/903, 904, 905, 907, 929, 436, 435, 917, 918

(56) References Cited

U.S. PATENT DOCUMENTS

| | | | |
|---|---|---|---|
| 3,673,560 A | 6/1972 | Barsh et al. ................. 340/901 |
| 3,760,349 A | 9/1973 | Kelster ........................ 340/902 |
| 3,784,970 A | 1/1974 | Simpkin ...................... 340/902 |
| 3,997,868 A | 12/1976 | Ribnick ........................ 340/902 |
| 4,238,778 A | 12/1980 | Ohshumi ..................... 340/903 |
| 4,403,208 A | 9/1983 | Hodgson ..................... 340/902 |
| 4,775,865 A | 10/1988 | Smith et al. ................. 340/906 |
| 4,794,394 A | 12/1988 | Halstead ...................... 340/902 |
| 5,307,060 A | 4/1994 | Prevulsky .................... 340/902 |
| 5,448,219 A | * 9/1995 | Yoshikawa et al. .......... 340/436 |
| 5,572,201 A | 11/1996 | Graham et al. .............. 340/902 |
| 5,940,010 A | * 8/1999 | Sasaki et al. ................ 340/901 |

* cited by examiner

*Primary Examiner*—Daryl Pope
(74) *Attorney, Agent, or Firm*—Kenneth A. Keeling; James E. Hudson, III

(57) ABSTRACT

The present invention is directed towards a danger alert system for a site, and in particular a moving site such as a vehicle. The danger alert system comprises a signal transmitter about a transmitting site for transmitting a signal. The invention further comprises a receiver alert system about a receiving site for receiving the signal emitted by the transmitter about the transmitting site. The receiver alert system then determines the likelihood of danger posed by the transmitting site based upon an analysis of the received signal. The receiver alert system is made up at least one signal receptor adapted for receiving the transmitted signal. The receiver alert system is made up of a velocity measurer, a site locator, and a danger assessor, all in communication with the signal receptors. The velocity measurer determines the relative velocity of the transmitting site from an analysis of the signal. The site locator determines a relative position of the transmitting site from an analysis of the signal. The danger assessor then assesses the danger between the transmitting site and the receiving site based on the relative position and relative velocity of the transmitting site with the receiving site.

37 Claims, 18 Drawing Sheets

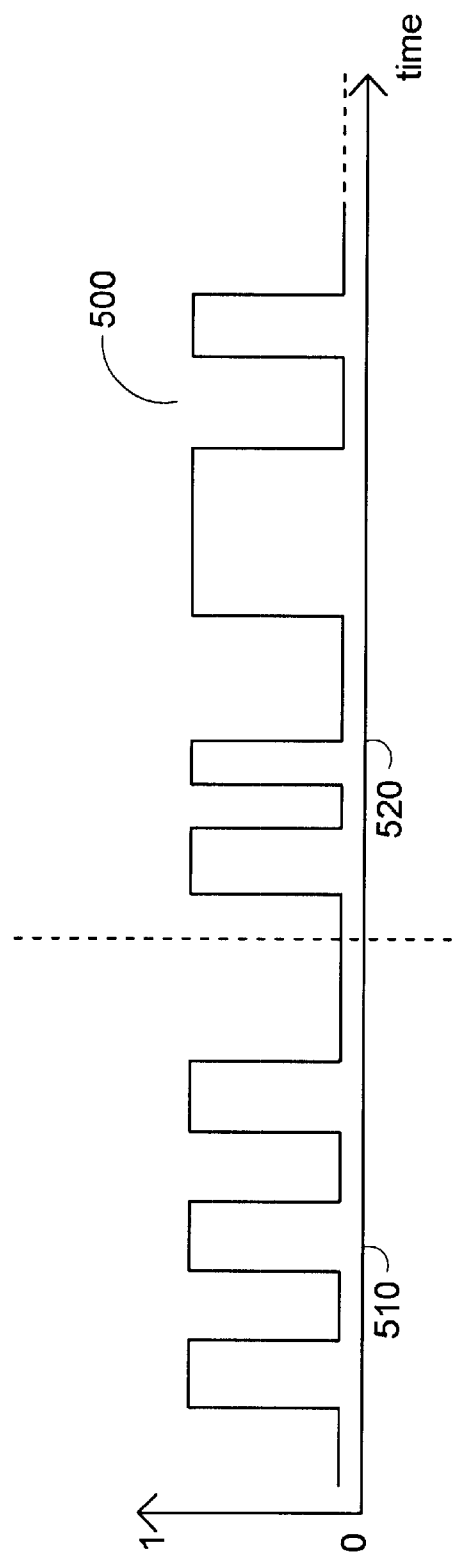

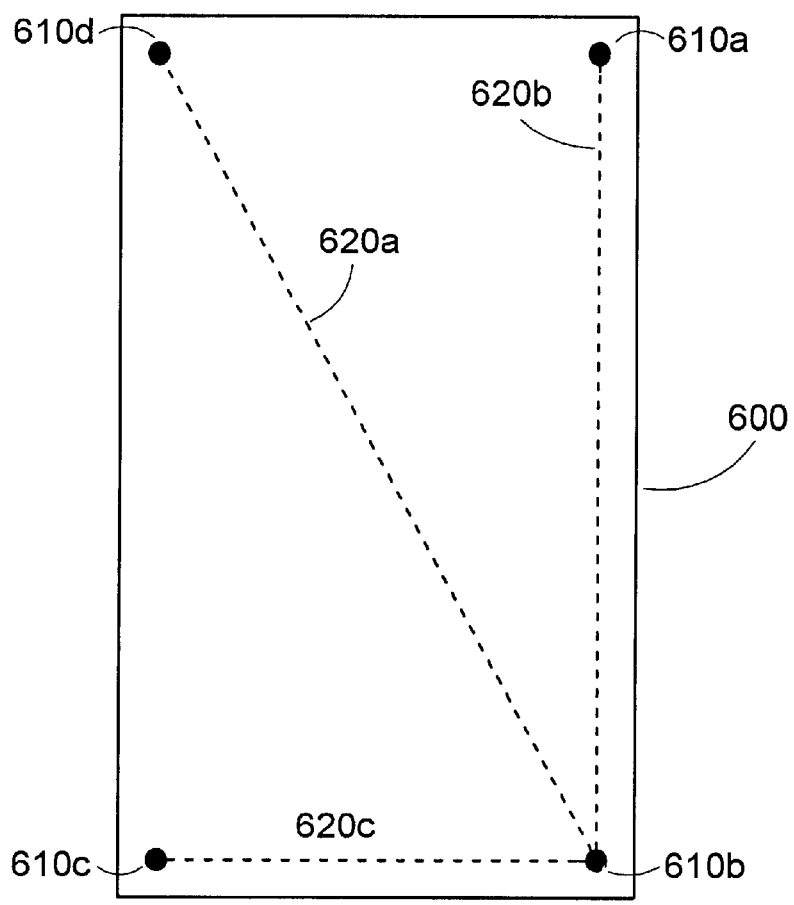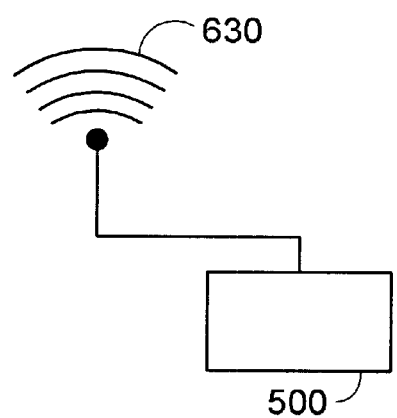
FIG. 6

DANGER WARNING SYSTEM

BACKGROUND OF THE INVENTION

This invention relates generally to a system for warning a site of the relative approach of a dangerous situation, such as an emergency vehicle or another emergency situation such as a fire. More specifically, this relates to a site, such as an emergency vehicle, equipped with an electronic signal transmitter emitting an signal containing a message. Preferably, this signal is an electromagnetic frequency signal, preferably a radio frequency. Another site, such as another vehicle, is equipped with a receiver alert system that warns an operator of the other site when a probability of a dangerous situation, such as a collision, exists.

For example, to assure right-of-way to approaching emergency vehicles, these emergency vehicles are equipped with audible and visual warning devices such as sirens and flashing red lights. Other motor vehicles nearby an approaching emergency motor vehicle can act accordingly and provide a safe right-of-way for the emergency vehicle once the drivers of those other vehicles are aware of the siren and/or flashing lights of the approaching emergency vehicle.

A timely warning especially depends on upon a driver's ability to hear an emergency vehicle siren that is external to and disconnected from the passenger compartment of the vehicle to be warned. Improved vehicle construction with respect to passenger compartment soundproofing, an increased ambient noise within the passenger compartment due to car radios and stereos, ventilation fans, and alike, have made it more difficult for the driver to hear the audible siren warning of an approaching emergency vehicle. This increases the probability that a clear right-of-way may be delayed for the emergency vehicle. Further, dangerous traffic conditions can arise when an unwarned driver obstructs an emergency vehicle that is often traveling at high speed.

In addition, other dangerous situations do not give notice to vehicles of the dangers associated with them. For example, an operator of a vehicle has no way of knowing that he is approaching a toxic fire or other hazard. A way of warning sites of dangerous situations their relative location, and a relative velocity is needed.

PRIOR ART

U.S. Pat. No. 3,673,560, Max, et al., reveals a vehicle alerting system comprising a transmitter in an emergency vehicle and a receiver in another vehicle. The receiver has a single antenna, which is designed to pick up a transmitted code from the transmitter on the emergency vehicle. Response to the signal from the emergency vehicle transmitter include both visual and audible outputs.

In U.S. Pat. No. 3,760,349, Keister, et al., reveals another emergency warning system. Keister discloses a transmitter mounted in an emergency vehicle. The transmitter transmits a specific code sequence of signals.

A receiver in each private car is designed to respond only to these signals. Response to these signals includes both light and audio indication. The receiver also includes a way to decode the incoming signals. Each separate decoded signal has a distinct alarm signal associated with a different emergency situation.

U.S. Pat. No. 3,784,970, Simpkin, et al., discloses a range-controlled emergency vehicle warning system with a directional radio frequency transmitter. The transmitter transmits general warning and advisory information on a radio frequency signal. The transmitter is limited to a controlled zone in front of the vehicle having a transmitter.

In U.S. Pat. No. 3,997,868, Ribnick, et al., an emergency vehicle contains a transmitter. The transmitter is connected to a directional device such as a compass. Depending upon the orientation of the directional travel of the emergency vehicle, the device generates a tone indicating the direction of travel of the emergency in an omni-directional manner. A receiver in another vehicle receives the radio frequency generated by the transmitter in the emergency vehicle. A particular tone frequency activates a set of lights carried by the receiving vehicle and indicates the direction of travel of the emergency vehicle. The driver of the second vehicle can then determine the relative direction of the emergency vehicle by comparing the emergency vehicle travel direction with his own travel direction.

In U.S. Pat. No. 4,238,778, Oshumi, discloses an electronic transmitter receiver system for warning a motor vehicle driver of the approach of an emergency motor vehicle. The emergency vehicle is equipped with a short range radio frequency transmitter. The transmitter is omni-directional. Oshumi uses the amplitude of the signal to initiate a warning signal within the second vehicle. As the relative distance between the two vehicles decreases, the strength of the warning signal increases, and vice versa. The entire apparatus only warns a second vehicle when the received radio signal is above a predetermined intensity.

In U.S. Pat. No. 4,403,208, Hodgson, discloses a vehicle warning system. Hodgson discloses a means for using the Doppler effect of a transmitted signal to indicate whether the vehicle carrying the transmitter is approaching or receding. When the transmitted radio frequency bearer is determined as receding from the receiver, the unit will shut it out. Hodgson also discloses a means by which the warning in the second vehicle is activated based upon the velocity of the transmitter towards the receiver.

However, Hodgson gives no indication of the velocity, meaning a speed and direction, of the transmitting vehicle. It only gives a relative distance, and no indication of the direction or location of the transmitting vehicle.

U.S. Pat. No. 4,794,394, Halstead, discloses emergency vehicle proximity warning system. Halstead discloses a transmitter carried on an emergency vehicle and receiver carried onboard a second vehicle. The transmitter modulates and transmits a continuing stream of equally timed spaced pulses. The receiver on the second vehicle receives the radio signal. It determines then whether the continuous stream of equally timed space pulses from the transmitter is present. If the timed spaced pulses are present, they start an alarm within the vehicle.

U.S. Pat. No. 5,307,060, Prevulsky, et al., discloses an emergency vehicle alert system whereby an emergency vehicle contains a transmitter. The emergency vehicle transmits an alert signal including an emergency vehicle type code. The second vehicle contains a receiver for receiving the radio pulses from the transmitter contained in the emergency vehicle. The second vehicle system then stores the codes to a stored set of type signals and alerts the driver accordingly.

In U.S. Pat. No. 5,572,201, Graham, et al., discloses another alerting device for abnormal situations. Again, an emergency vehicle contains an active radio transmitter. The transmitter emits a range limited signal. The transmitter onboard the emergency vehicle includes an automatic gain control that responds to the speed of the emergency vehicle to control the range of the transmitted signals in relation to the speed of the vehicle. Graham also discloses a way to shape the radiation pattern of the emergency signals broadcast by the transmitter, especially backwards and forwards. Graham also discloses sensors onboard emergency vehicles providing information regarding the speed, direction, and instantaneous position of the vehicle. This information is relayed and decoded to provide a visual display of the position, direction, and speed of the transmitting vehicle. Graham discloses the emergency vehicle receiving information describing the directional heading of the emergency vehicle from a compass. This information is encoded and transmitted to other emergency vehicles for other vehicles containing a receiver equipped to decode it.

All of the noted prior art deals with only half of the true picture of the situation. Both the transmitting and receiving vehicles have velocities, meaning a speed and a direction. A more accurate determination of the possibility of collision is available when one knows the location of the transmitting vehicle. In addition, further accuracy is achieved when the relative velocity, both speed and direction, of the transmitting vehicle is determined with respect to the receiving vehicle. If one can determine the location and relative velocity of the transmitting vehicle, a designer can implement a more precise warning system, thus making the warning system more effective.

None of these systems can determine the possibility of collision based upon true velocity or location measurements. A velocity measurement means that a one determines both the speed and direction of the vehicles. None of the prior art makes these determinations. None of the prior art allows for a direct calculation of the possibility of collision based upon the relative velocity of the transmitting vehicles with respect to the receiving vehicle. Additionally, none of the prior art makes a determination of the relative location of the transmitting vehicle with respect to the receiving vehicle.

What is needed is a vehicle alarm that actively computes the speed and direction of an oncoming emergency vehicle. What is needed is a vehicle alarm that actively determines whether the driver of the second vehicle needs to be warned based on the velocity of the transmitting vehicle, and on the velocity of the receiving vehicle. Additionally, what is needed is a vehicle alarm that calculates the relative location, and not just the distance, of a transmitting vehicle with respect to the receiving vehicle. Based on these conditions, a more accurate determination of the possibility of a collision can be made and relayed to a driver.

SHORT DESCRIPTION OF THE INVENTION

The present invention is directed toward a danger warning system in which passive and active inputs are used to alert an operator of a site, such as a vehicle, to the presence of dangerous situations, such as an oncoming emergency vehicle or other dangerous situation. The invention also determines whether there is a significant danger to the operator based on the proximity of the danger and the relative velocity of the danger to the receiving site.

The danger alert system comprises a signal transmitter about a site signifying danger. Preferably, the system comprises an electromagnetic frequency transmitter mounted about the site. One should note that the invention is not limited to dynamic and moving sites, such as emergency vehicles, but can be associated with a static site signifying a risk of danger, such as the location of construction or an ongoing fire.

The signal transmitter is connected to an antenna that broadcasts a signal outwards from the site. A site may have a speed sensor, a direction sensor, or a position sensor associated with it. These sensor outputs are connected to the signal transmitter in order that the information derived from them may be broadcast with the signal output by the signal transmitter. Preferably, this information is broadcast in the form of a message.

An encoder bridges the signal transmitter and the sensor output. The encoder serves to put the data obtained by the sensors into a form suitable for broadcasting via the signal transmitter.

The encoder also accesses a unique site identification code. The encoder may contain the unique site identification code, or an external source may supply this to the encoder. An additional input may be provided by the site indicating an extremely dangerous situation, such as a hot pursuit of another vehicle by an emergency vehicle.

Describing the preferred embodiment, the sensor readings, the unique site identification code, and the indication of an extremely dangerous situation, if not already in a digital format, are digitized and stored as a digital data message. Regular spaced timing digits are placed at the front of the digital data message. The encoder then encodes the entire digital message into an analog message representative of the digital message. This message is directed towards a signal transmitter generator where it is transmitted. In the preferred embodiment, the signal transmitter generates an electromagnetic signal, and the message is modulated and output as an electromagnetic frequency signal. In this embodiment, a very precise wavelength controller, such as a crystal oscillator, directs the operation of the electromagnetic frequency signal generator.

Controlled inputs from the transmitting site, such as a siren or warning light of an emergency vehicle, may turn the signal transmitter on and off. This enables or disables the transmission of the signal.

Further, the gain of the signal transmitter is increased as the site speeds up. Thus, the effective broadcast range of the signal transmitter is increased to compensate for the site's increased rate of speed.

In a preferred embodiment, an amplitude detector monitors the output amplitude of the transmitted signal and assigns a value corresponding to the output amplitude. A feedback loop connects the amplitude detector with the encoder. The feedback loop makes the monitored amplitude value of the transmitted signal available to the encoder, which inserts the monitored amplitude value of the transmitted signal into the next message set for transmission. Thus, the next transmitted message contained in the transmitted signal will contain information about the amplitude of the previous transmitted signal.

Other sites are equipped with a receiver alert system. In this receiver alert system, tuners are prepared to receive a transmitted signal on the appropriate frequency. The tuners are connected to a plurality of signal receptors, such as antennae, placed around the site at a fixed and known distance from one another. In the case where the receiving site is a vehicle, in a preferred embodiment the signal receptors are placed on the vehicle and in close proximity to the four corners of the vehicle. In another preferred embodiment, signal receptors are placed at different heights on or about the receiving site. Using the spatial distance of the signal receptors, the system determines a relative location, meaning direction and distance, to the transmitting vehicle from the receiving vehicle based on the phase differences of the incoming signal at each of the signal receptors.

The receiver alert system contains a velocity measurer for measuring the relative velocity of the transmitting site. The receiver alert system also contains a site locator for determining the relative position of the transmitting site. These components determine the relative position and velocity of the transmitting site by analyzing the transmitted signal, and the message contained therein.

In addition, in the preferred embodiment, the receiver alert system is equipped with a precise frequency detector, such as one controlled by a crystal oscillator. A relative velocity of the transmitting vehicle may be determined from differences in received and transmitted wavelengths, or Doppler shift, of the incoming transmitted signal at each of the signal receptors.

The incoming message contained within the transmitted signal is then extracted from the transmitted signal. In the preferred embodiment, the transmission amplitude of the previous transmitted signal is extracted, along with the unique site identification code. In addition, the site's speed and its direction of travel may also be extracted. The amplitude of the previous transmitted signal is compared to the received signal amplitude, and an estimate of the distance from the receiving site to the transmitting site is made. In addition, any changes in distance can be used to cross check previous velocity determinations. In the preferred embodiment, these parameters are made available to an onboard CPU which aids in the determination.

In the preferred embodiment, the CPU serves as a velocity measurer, a site locator, and a danger assessor.

If the transmitting site has broadcast previous messages, the relative velocity and location as determined by the phase difference of the transmitted signal at the signal receptors and the Doppler shift of the transmitted signal are rechecked. The differences in relative location between the previous signal and the current signal are checked against a direct measurement of the relative velocity of the transmitting site based on the Doppler shift of the signal at each of the signal receptors.

This is also checked against the distance. The current transmitted signal contains information about the amplitude of the previous signal. The fall off in amplitude of the signal as received versus the amplitude as broadcast gives an indication of the distance between the transmitting site and the receiving site as of the previous signal.

In the preferred embodiment, the invention also links the CPU to both a direction and speed sensor associated with the receiving site. The invention assesses the danger posed by the transmitting site to the receiving site. In the preferred embodiment, the invention determines a zone of safety around the receiving site. This zone is dynamic and is responsive to the receiving site's speed and direction of travel. Based on the relative velocity of the transmitting site with respect to the receiving site, the invention calculates whether a the transmitting site will violate the zone of safety.

When the invention indicates that the transmitting site will violate the zone of safety within a certain time, the invention causes an alert to broadcast on an alert system indicating that the transmitting site poses a possible danger to the receiving site. The alert system is made up of both audio and visual indicators. These indicators serve to tell the relative direction of the transmitting site, the relative distance, and the degree of danger posed by the transmitting site.

DESCRIPTION OF THE DRAWINGS

FIG. 4 is a diagram of a message according to the present invention.

FIG. 5 is a timing diagram of a digital message such as that in block 4, preceded by timing pulses FIG. 6 is a top view of a receiving site, such as a vehicle, showing the placement of signal receptors about the site in the horizontal plane.

DETAILED DESCRIPTION OF THE INVENTION

Figure 1:
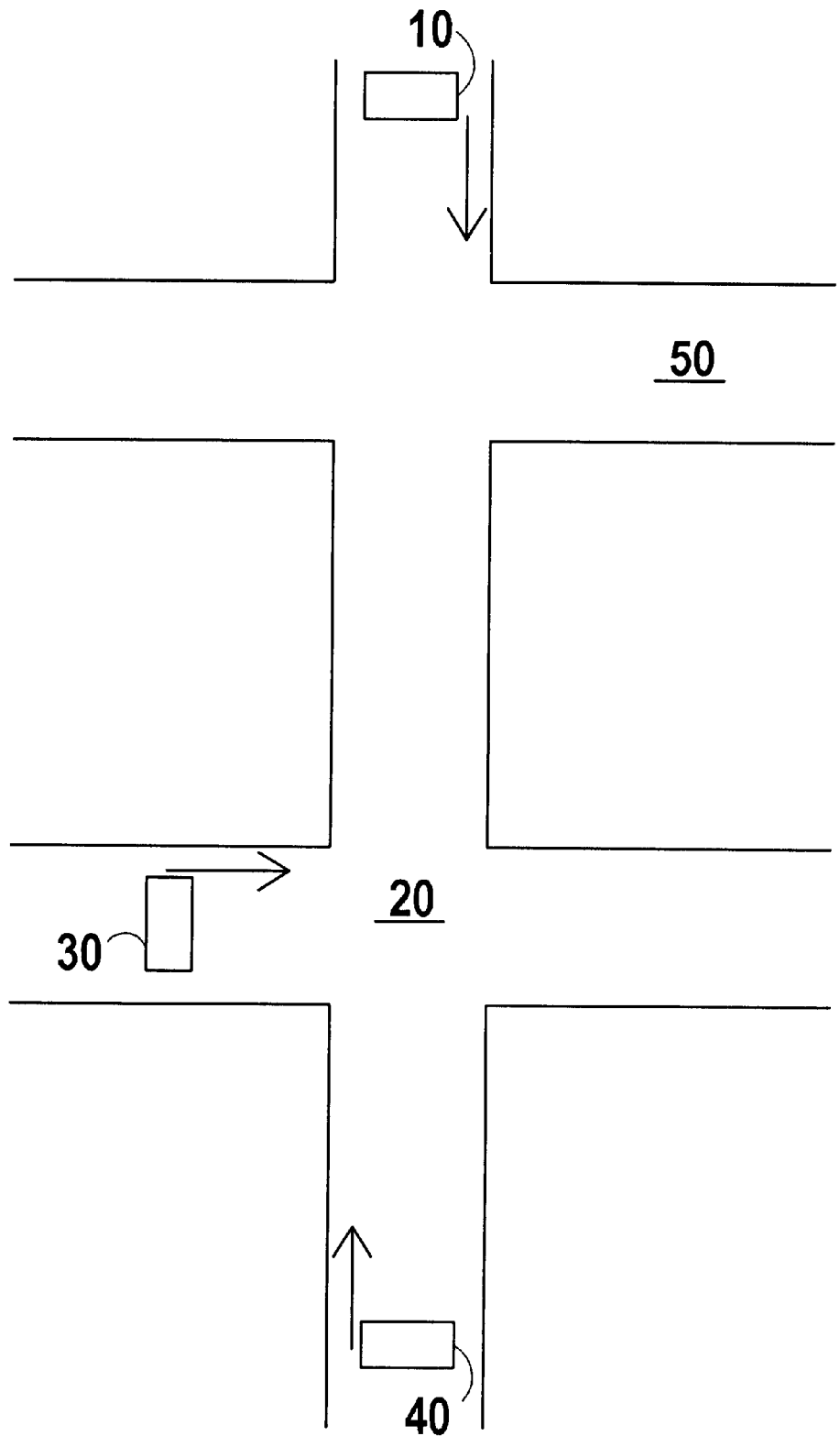
FIG. 1 is a diagram of a situation where a danger alert system would be useful.

FIG. 1 depicts a site 10, such as an emergency vehicle, approaching an intersection 20 at which other vehicles 30 and 40 are poised to enter. This situation is potentially dangerous. If the operators of vehicles 30 or 40 do not perceive the oncoming emergency vehicle 10 and proceed into intersection 20, it is possible that they could collide with emergency vehicle 10. Even if vehicle 10 may be moving with its emergency lights and sirens may be on, a possibility exists that the drivers of cars 30 and 40 will not notice them. Thus, an alarm system for the drivers of vehicle 10 and cars 30 and 40 is needed. Further, if vehicle 10 makes a left or right on street 50, it is necessary to deactivate any alarms in vehicles 30 and 40 since vehicle 10 no longer poses a threat to them in its motion.

Figure 2:
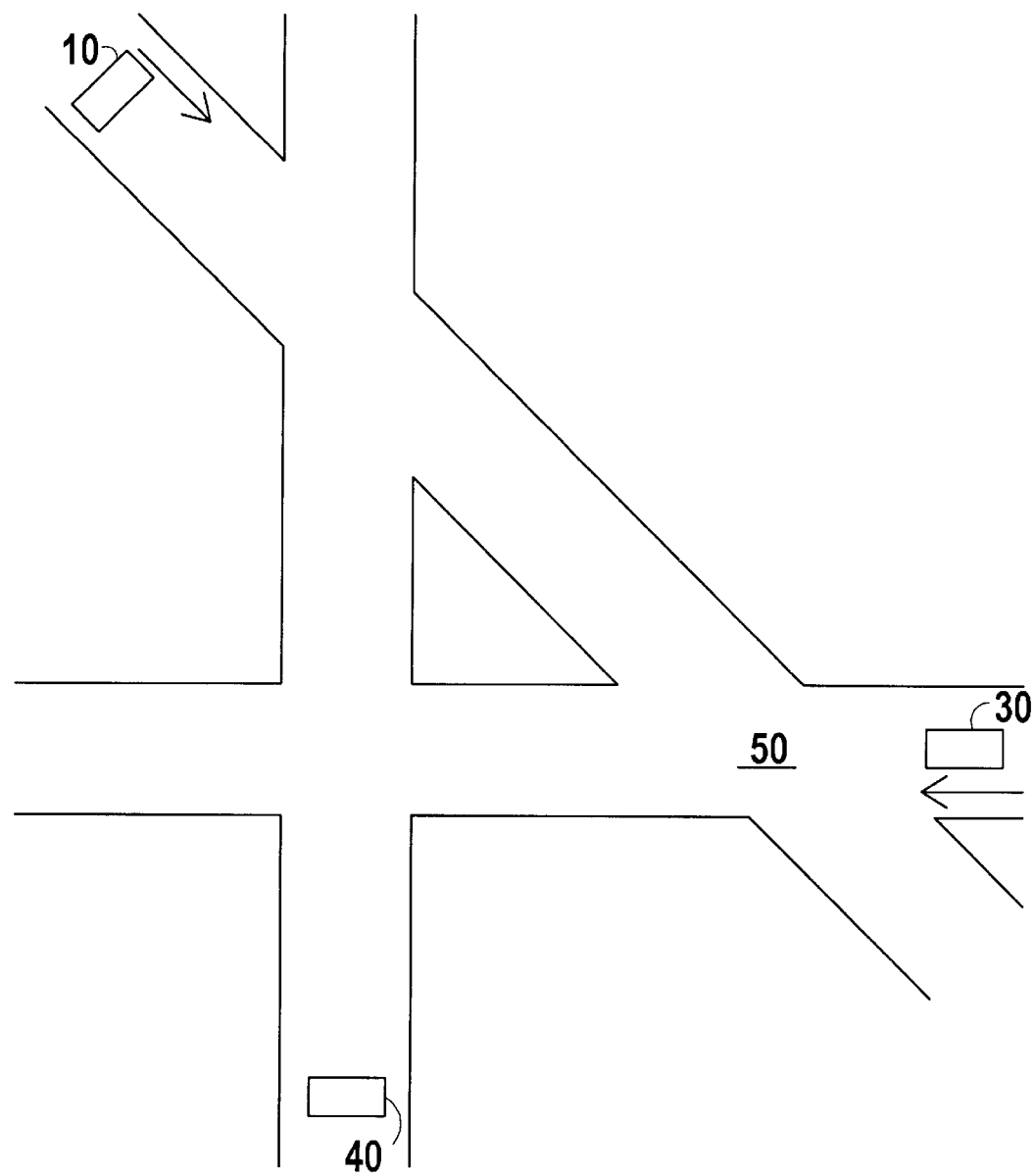
FIG. 2 is a diagram detailing portions of the invention where it can discriminate between a dangerous situation and a non-dangerous situation.

FIG. 2 depicts another situation where vehicle 10 is traveling in a direction which is decreasing the distance between itself and vehicles 30 and 40. Vehicle 30 is approaching intersection 50, as is vehicle 10. However, vehicle 30 will pass through intersection 50 well before vehicle 10. Vehicle 40 is shown at rest. Although approaching vehicles 30 and 40, vehicle 10 will not threaten them because its path of travel will not bring it within a certain proximity of vehicles 30 and 40. Vehicles 30 and 40 do not pose a hazard to vehicle 10, and they will not collide with it. Although approaching the two other vehicles, vehicle 10 will pass clear of them. Prior art systems could not discriminate this situation and would issue an alert based on the vehicles simply closing distance. The present invention will recognize these situations, thus decreasing the numbers of false alarms for the occupants of other cars.

The present invention works to warn other sites of the approach of another site in a predictive fashion. As noted before, the prior art merely warns other sites when the transmitting site is in a certain proximity based on the power of the signal received by the receiver site. At most, the prior art can detect the approach of the transmitting site, but does not give information about the direction of approach, the relative location, or the relative velocity of the transmitting site with respect to the receiving site. The present invention determines the direction of approach, the relative location, and the relative velocity of the transmitting site through redundant means.

In the present invention, a site 10 contains a transmitter and emits a signal when engaged in operations that necessitates the warning of other sites in the area. Other sites contain a receiver to receive the signal emitted from emergency site 10, and determine the likelihood of collision of the receiving site with emergency site 10.

Figure 3:
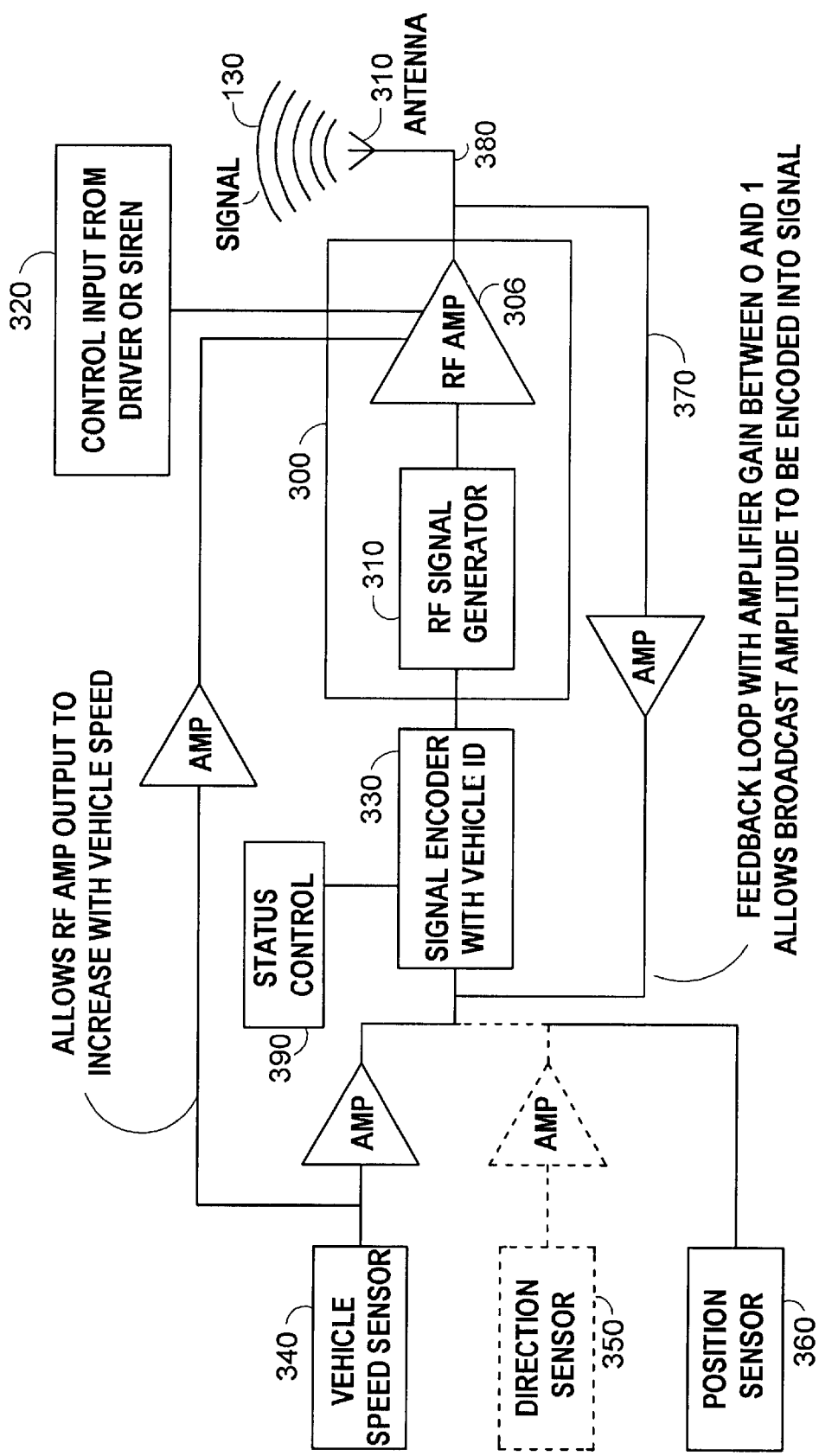
FIG. 3 is a block diagram of a transmitter of the present invention.

FIG. 3 depicts a transmitting system of the invention. Signal transmitter 300 is adapted to emit a signal such as an electromagnetic frequency signal, and is connected to an antenna 310. A control mechanism 320 turns signal transmitter 300 on or off, depending upon several criteria. In the preferred embodiment, the control mechanism 320 turns on signal transmitter 300 when the transmitting site is engaged in emergency operations. Thus, the same switch controlling an emergency vehicle's lights or siren can also be used to activate signal transmitter 300.

A signal encoder 330 is connected to signal transmitter 300. Signal encoder 330 has access to a unique site identification code. In the preferred embodiment, this site identification code would also serve to identify the site type (e.g. fire engine, ambulance, law enforcement, toxic spill, fire, etc.) This site identification code may be unique to the encoder, or alternatively, another piece of equipment about the site supplies signal encoder 330 with the site identification code.

The output of transmitting site speed sensor 340 is also connected to signal encoder 330. In a preferred embodiment, the output of site direction sensor 350 is present and also connected to signal encoder 330.

Optionally, a site position sensor 360, such as a satellite positioning system or other navigational device, is onboard or about the transmitting site. The output of positioning device 360 is also made available to signal encoder 330.

In the preferred embodiment the output of transmitter 300 is sampled when each message is broadcast. In a preferred embodiment, the output amplitude of the transmitted signal is monitored at the time of broadcast at point 380. This monitored broadcast amplitude is assigned a value corresponding to the amplitude of the transmitted signal. This monitored transmission signal amplitude value is made available to signal encoder 330 via feed back loop 370.

Signal encoder 330 collects the various information and assembles it into an message. In the preferred embodiment, the encoder digitizes the sensor outputs, if not already in digital form, and assembles the data into a digital message.

As shown in FIG. 4, the message 400 has a unique site identification code field 410, emergency status 420, site speed sensor value 430, site direction sensor value 440, site position value 450, and previous transmitted signal amplitude value 460. In this embodiment, each field is defined as one or more binary digits representing a particular value.

It should be noted that the outputs of the site speed sensor 340, site direction sensor 350, site position sensor 360, and broadcast amplitude value as sampled at point 380 can be digitized upon sampling and routed to signal encoder 330, or digitized and sampled by signal encoder 330. In addition, it should be noted that the output of each of the previously mentioned units could already be in digital form and need not be digitized.

Signal encoder 330 collects the aforementioned data and assembles a message for broadcast via signal transmitter 300. In the preferred embodiment, message 400 is transformed into a form capable of being transmitted via electromagnetic frequencies. In the preferred embodiment, message 400 is transformed into a series of precisely defined equally spaced pulses, each pulse defining one of the binary values making up encoded message 400. In the preferred embodiment, a plurality of equally spaced alternating pulses are placed at the beginning of the message 400 for timing purposes, as shown by pulses 510 in digital stream 500. Pulse stream 520 is the pulse stream representation of the binary digits of encoded message 400. In the preferred embodiment, encoder 330 transforms this digital data into an analog signal representation of the digital message in order for it to be transmitted by signal transmitter 300.

In the preferred embodiment, signal transmitter 300 is made up of electromagnetic frequency generator 310 connected to electromagnetic frequency amplifier 320. A representation of digital message 500 is presented to electromagnetic frequency generator 310 via output 390 of signal encoder 330.

In the preferred embodiment, electromagnetic frequency generator 310 modulates message 400 represented by pulse stream 500. This signal is then amplified by electromagnetic frequency amplifier 320, and transmitted through antenna 310 as transmitted signal 130. It should be noted that the methods of generating an encoded message and broadcasting them over an electromagnetic frequency are well known in the art, and are not discussed here in further detail. It should be noted that the invention comprehends the use of all types of electromagnetic broadcasting techniques, including, but not limited to, frequency modulation, amplitude modulation, pulse modulation, and various forms of side band modulation. It should also be noted that other methods of encoding and transmission of information are contemplated by the invention.

In the preferred embodiment, another status control 390 is connected to signal encoder 330. This status control 390 is used to indicate the mode of the emergency site and whether other extraordinary situations exist. For example, if the emergency site is a law enforcement vehicle and is in hot pursuit of another vehicle, this control would be turned on to indicate that an extraordinarily dangerous situation is in progress. Or, for other emergency sites, the control could be used to signify a burning building, a toxic spill, or a chemical release. Thus, the status control would give an indication of the nature of the emergency and would modify the characteristics of the receiver alert system accordingly.

Site speed sensor 340 is connected directly with signal transmitter 300. This allows the gain of signal transmitter 300 to be increased or decreased based on the current speed of the transmitting site. Thus, when the transmitting site is moving at a greater rate of speed, signal transmitter 300 outputs a greater strength signal. This allows for a greater broadcast range for a faster moving transmitting site, and improves the safety aspects of the invention.

Figure 6A:
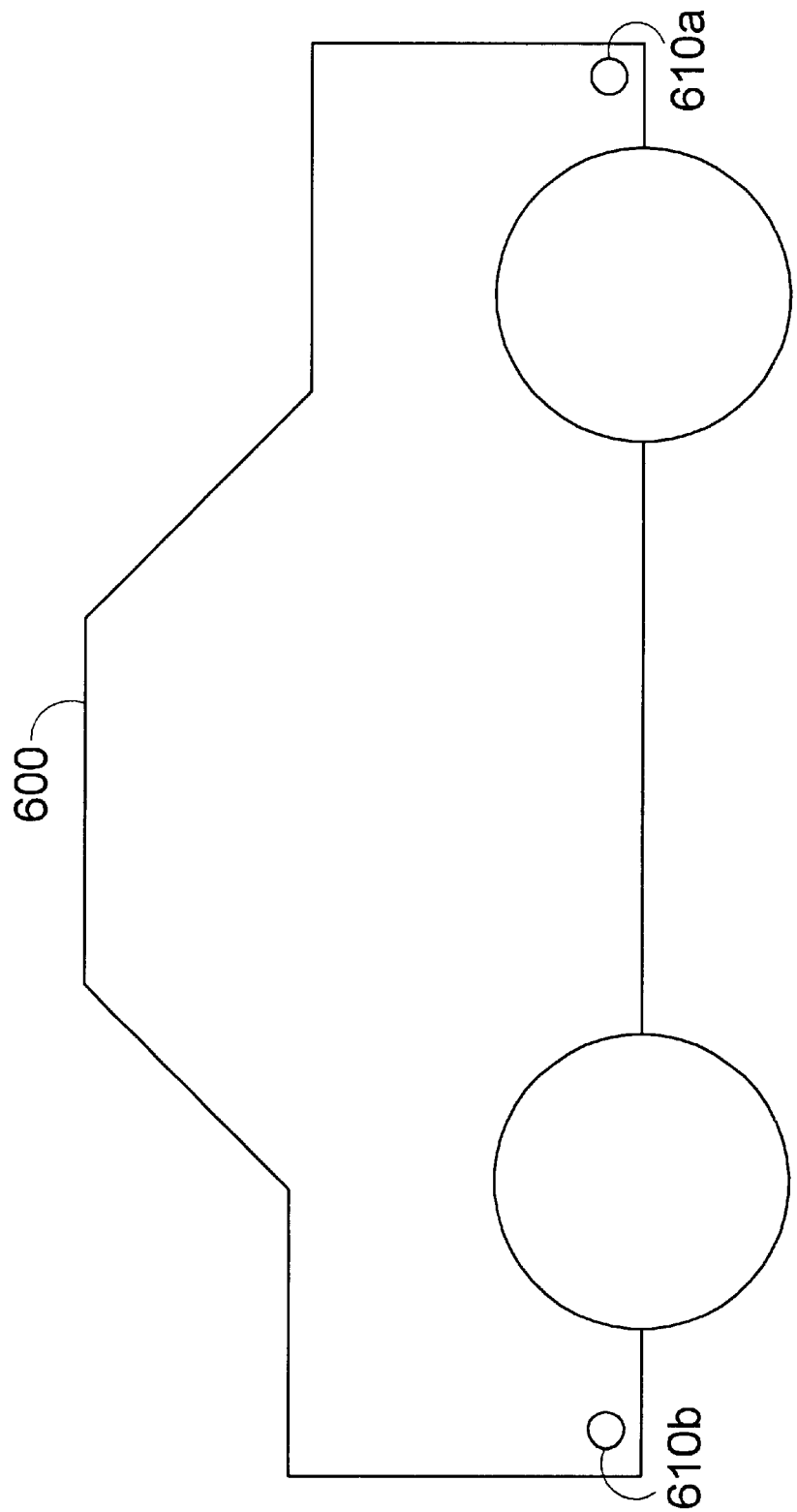
FIG. 6a is a side view of a site, such as a vehicle, showing a possible placement of signal receptors.
Figure 6B:
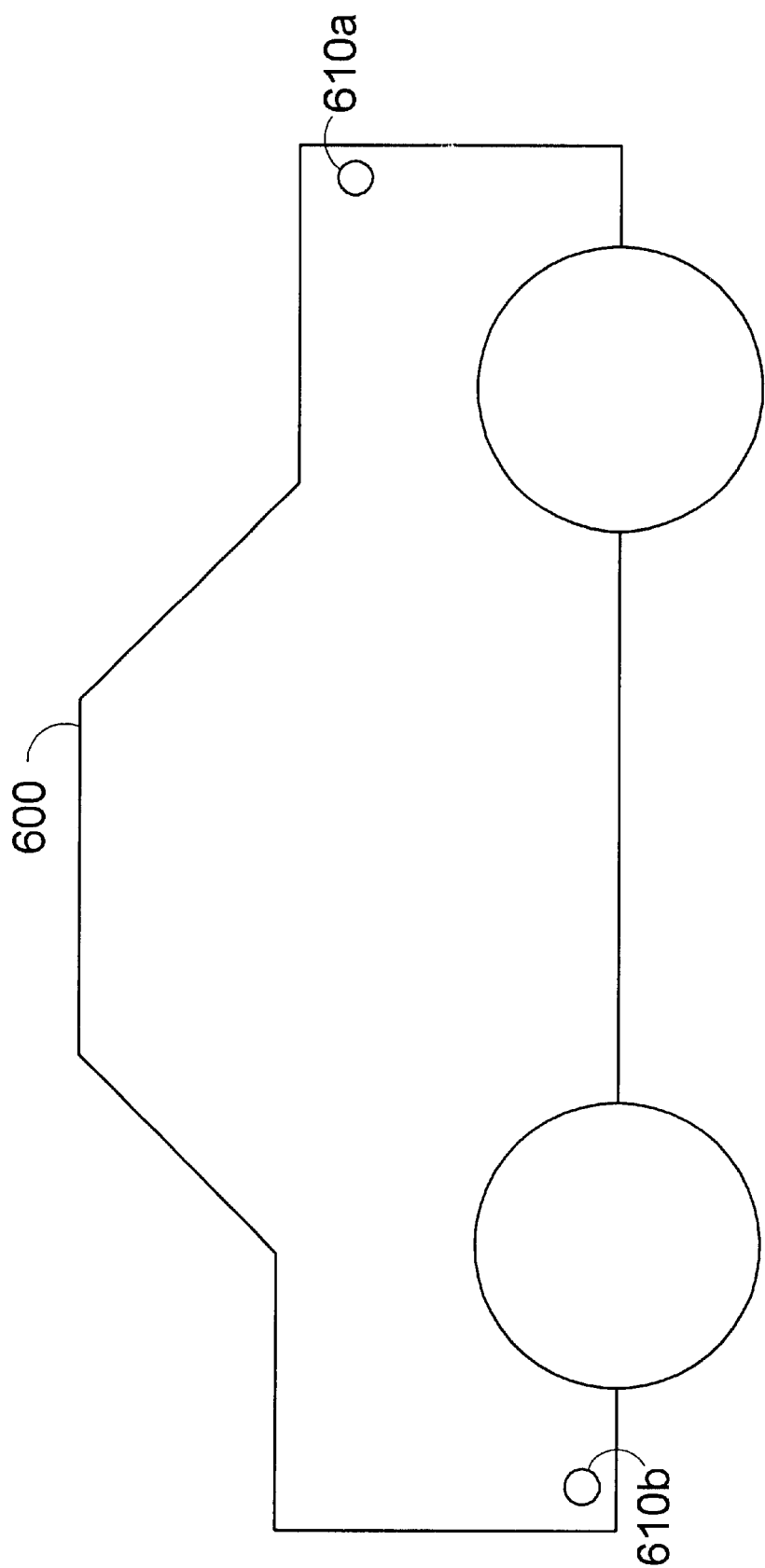
FIG. 6b is a side view of a site, such as a vehicle, showing a placement of signal receptors about a site having both a horizontal and vertical displacement.
Figure 6C:
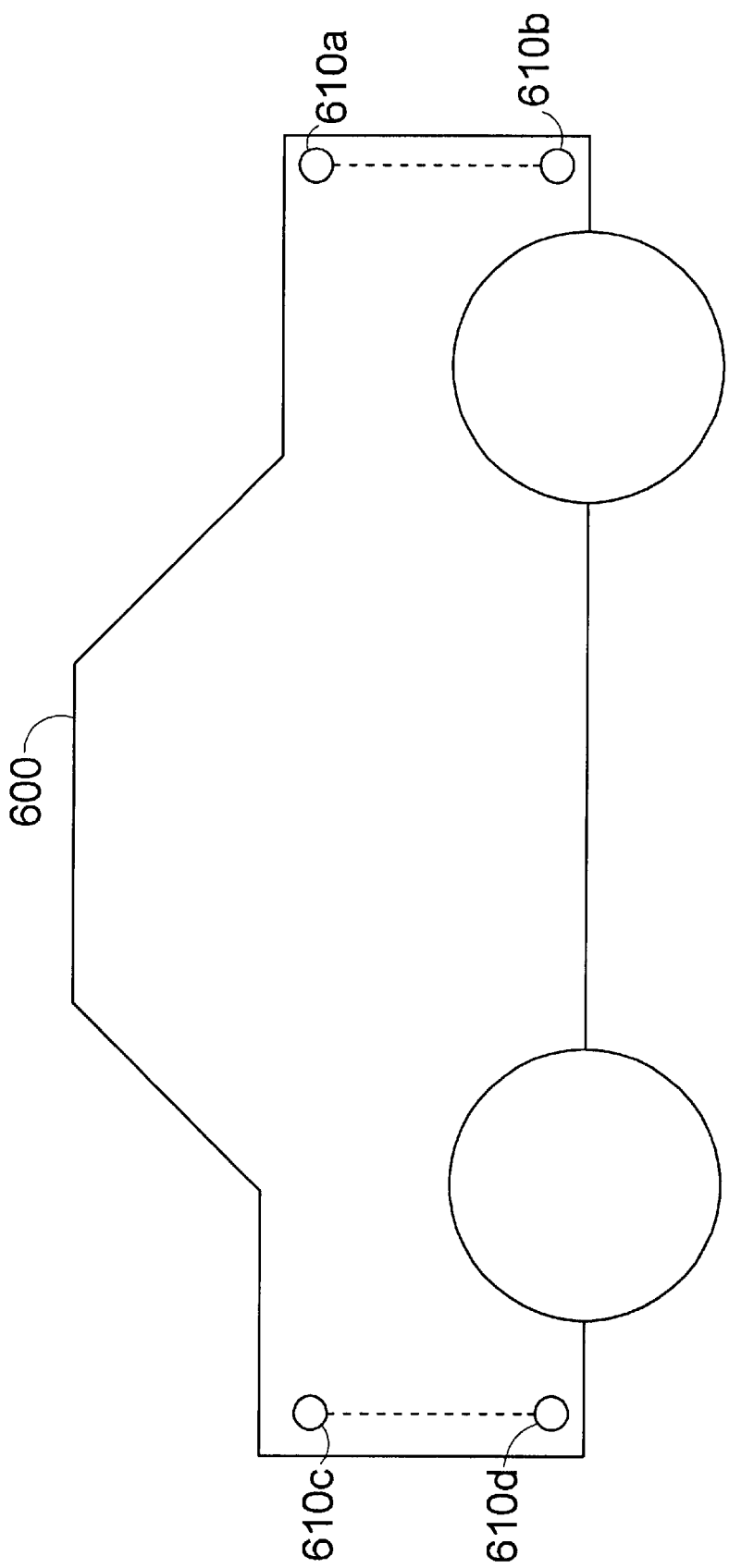
FIG. 6c is a side view of a site, such as a vehicle, whereby the signal receptors are grouped in clusters.

The receiver alert system of the invention is shown in FIGS. 6, 6a, 6b, 6c, and 7. A plurality of signal receptors 610 are spaced about site 600, as shown in FIG. 6. Care should be taken that the distance between signal receptors, signified by dashed lines 620a–620c, is not an integer multiple of wavelengths of the transmission frequency of signal transmitter 300. Signal transmitter 300 emits transmitted signal 630, which is received by signal receptors 610a–610c, and possibly 610d. Depending on the geometry and composition of site 600, transmitted signal 630 received by signal receptors 610b, 610c, and 610d may be partially attenuated or blocked. A plurality of signal receptors are necessary, and preferably at least three should be used.

In the preferred embodiment, signal receptors 610a–610d are placed in the same vertical plane and at points as far removed from one another as possible, as diagramed in FIG. 6. Preferably, when four signal receptors are used, an imaginary line connecting each signal receptors, shown as ghost lines 620b and 620c, contains inclusive right angles. However, it should be noted that this signal receptor topology is not necessary to the operation of the invention. It should be noted that the signal receptor topology can be practically any form. However, offsets between the signal receptors 610a–610d should be as great as possible in order to have as great a baseline as possible. This aids greatly in the determination of a relative position and relative velocity based on the incoming transmitted signal 630.

In the preferred embodiment, signal receptors 610a–610d are placed in the same vertical plane as one another, as diagramed in FIG. 6a. Thus, precise determinations of location are affected minimally by any vertical offset in the signal receptors location. It should be noted, however, it is possible to implement the invention with signal receptors 610a–610d having a vertical displacement from one another, as shown in FIG. 6b.

In an alternative embodiment, diagramed in FIG. 6c, the invention utilizes dual sets of signal receptors, placed directly in line with one another in the vertical plane. This geometry effectuates the ability to discriminate transmitter vertical displacement with better detail.

Figure 7:
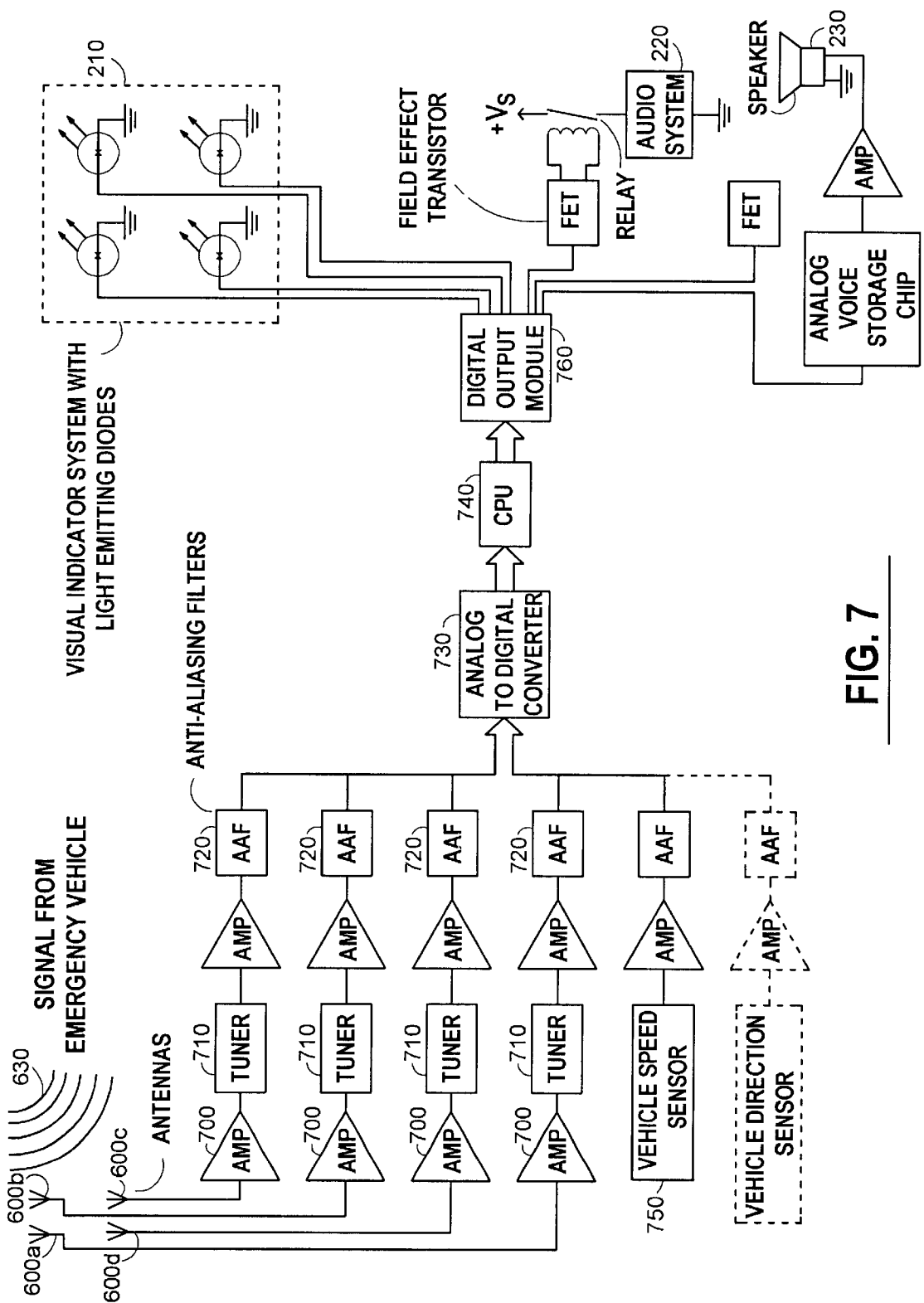
FIG. 7 is a block diagram of a receiver alert system of the invention.

The receiver alert system of the invention is further detailed in FIG. 7. In the preferred embodiment signal receptors 610a14 610d are each connected to an amplifier 700, and then to a tuner 710. In the preferred embodiment, the output of the tuner is connected to an anti-aliasing filter 720. The anti-aliasing filter serves to filter out inherent frequency related noise associated with the modulation and reception of electromagnetic frequency transmissions.

Preferably, each received signal is forwarded to an analog to digital converter 730, where the received signal from each signal receptor is sampled and stored in digital form. The signal received at each signal receptor is timed as it is received. Thus, a representation of the received signal along with the time it is received at the corresponding signal receptor is preserved. It should be noted that a multi-port analog to digital converter may be used as diagramed, or a single port analog to digital converter may be attached to each line.

The receiver alert system comprises a velocity measurer, a site locator, and a danger assessor whereby each of these units uses the incoming signals from the signal receptors.

The velocity measurer determines the relative velocity of the transmitting site to the receiving site. The site locator determines a relative position of the transmitting site to the receiving site. The velocity measurer and the site locator rely at least in part on comparing the received signals on each of the signal receptors via a signal comparator. The danger assessor uses the outputs of the velocity measurer and the site locator to determine the possibility of danger posed by the transmitting site to the receiving site.

In the preferred embodiment, each of these units comprises a central processing unit (CPU). Using the digital representations of the analog signal, the receiver alert system can determine the danger posed by the transmitting site to the receiving site. In addition, the CPU can perform as a signal comparator. The preferred embodiment is diagramed in FIG. 8.

In the preferred embodiment, in the absence of activity, the CPU cycles in a state where awaiting an incoming signal in block 800. On the reception of a transmitted signal, the receiver alert system demodulates the stored and digitized received signals from each signal receptor, and extracts the representation of pulse string 500 from transmitted signal 630. The receiver alert system then reconstructs encoded message 400 from pulse string 500. These events occur in blocks 810 and 820. The system then determines the amplitude of the received signal in block 830.

Control flows to block 840, the system determines if the transmitting site is in range. This can be determined by the reception of signal 630 relative to signal receptors 610a–610d.

Figure 9:
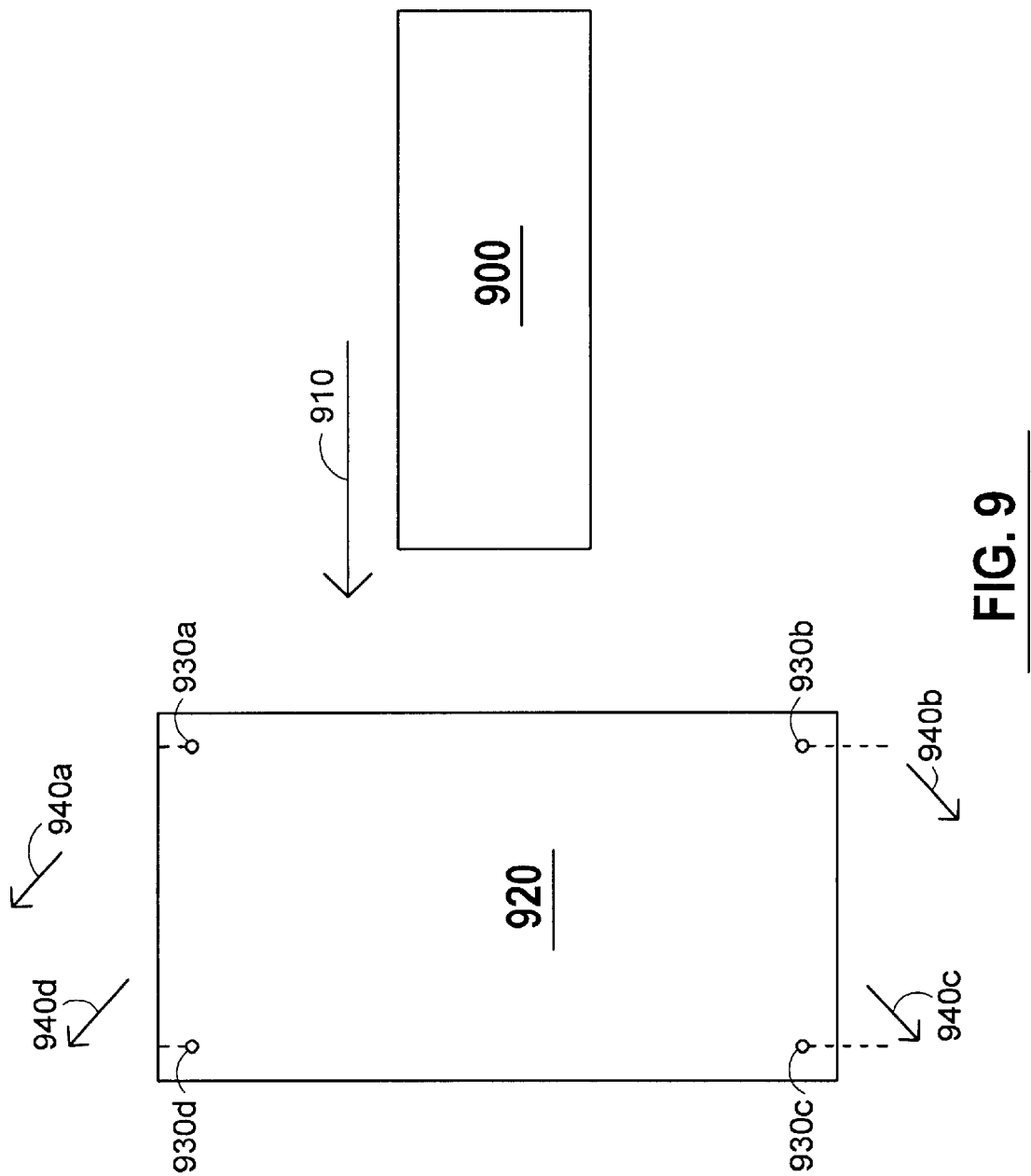
FIG. 9 is a diagram detailing a way of determining a relative velocity of a transmitting site according to the invention.

This site locator is detailed in FIG. 9. The difference in phase between the received signal 630 received at signal receptors 610a14 610d is determined in block 900. From the difference in phase among the signal receptors, and given that signal receptors 610a–610d are a known distance from one another, a relative position of the transmitter can be determined with respect to the receiving site in block 910. It should be noted that although the processing is taking place on a digitized version of the analog signals, this could be determined directly from the analog signals themselves before the sampling.

Next, in block 920, the system determines if the receiving site is within range of the transmitting site. A threshold distance is compared to the distance from the receiving site to the relative location of the transmitting site computed in block 910. If the distance from the receiving site to the transmitting site is greater than the threshold distance, control transfers to block 800 for arrival of another message. If the distance from the receiving site to the transmitting site is less than the threshold distance, control transfers to block 850 in FIG. 8 for further processing.

Next, unique site identification code 410 is extracted from message 400 in block 850. This unique site identification code is compared to other known site identification codes in block 860. If there is a match, meaning a message from this transmitting site has been previously received, processing flows to block 1010 in FIG. 8a. If not, this is a newly encountered transmitting site, and control flows to block 870 in FIG. 8b.

The velocity measurer is now detailed. In block 870, an initial relative velocity for the particular transmitting site is determined. As shown in FIG. 9, a transmitting site 900 has relative velocity represented by arrow 910 with respect to the center of receiving site 920. However, velocity 910 with respect to signal receptors will have a different relative velocity to each of signal receptors 930a–930d. The different relative velocities to each signal receptor is represented by velocity vectors 940a–940d, respectively.

As site 900 approaches site 920, the frequency of signal 630 is affected by this relative velocity. Thus, the frequency of signal 630 is affected differently at each signal receptor 930a–930d due to the fact that the relative velocity of site 900 is different with respect to each of these signal receptors. Thus, the system determines the relative velocity of site 900 based upon differences in the frequency received at signal receptors 940a–940.

The receiver alert system then analyzes pulse string 500 making up encoded message 400 within received signal 630. The Doppler shift due to the different relative velocities at each signal receptor will then shrink or expand the initial pulses 510 in pulse string 500. The receiver alert system analyzes the received pulses 510 and compares them to the expected value for the width of the pulse. Therefore, the receiver alert system determines the relative velocities of site 900 with respect to each of the signal receptors 940a–940d based on Doppler induced expansion or shrinkage in the width of these pulses. Based on these relative velocities, the receiver alert system determines the relative velocity of site 900 with respect to any point of site 920.

Thus, the actual initial velocity of the transmitting site is determined from multiple signal receptor receptions. At this point, the initial location and velocity of the newly encountered transmitting site are stored for future reference.

The receiver alert system then determines the danger posed by this new transmitting site in blocks 880 and 890. The receiver alert system determines the transmitting site's probable relative travel path from its initial relative starting position and extended out using its initial relative velocity.

A warning zone is defined around the receiving site. If the transmitting site's probable relative path would enter the receiving sites warning zone within a set time, the receiver alert system triggers an alert situation as shown in block 1000. Control would then revert to block 800 to await new messages. If there is no likelihood of danger, control reverts to block 800 directly from block 890.

If the transmitting site is a known site, control transfers to block 1010. There, the receiver alert system determines a relative velocity as previously, and checked a number of ways.

First, a relative velocity is extracted from the Doppler shift as described above. Second, a relative velocity is determined from a comparison of the relative position of the transmitting site with respect to the receiving site between the current received signal and the one previously stored.

Third, an estimation of the relative approach speed of the transmitting site may be made using the changes in amplitude of the received signal, along with an estimation of the distance to the transmitting site.

In block 830, the amplitude of the received signal is determined and saved. When the next received signal is processed, the amplitude of current received signal is compared to that of the previous. An increase or decrease in amplitude corresponds to a particular decrease or increase in distance. Thus, a difference between received signal amplitudes relates to a difference in relative distance traveled. Since the signal is timed, the relative distance can be converted to a relative speed with respect to the receiving site.

In addition, the message contains an output amplitude for the previous transmitted signal. From a comparison of the previous transmitted signal amplitude, as included in the message, with the actual received amplitude of the previous signal, a relative distance to the transmitting site for the previous message can be determined from the degradation of the amplitude to the signal. Further, as before, a relative speed can be extracted from this calculation over time.

In addition, the outputs of transmitting site sensors as sent in the message may all be utilized in the determination of both relative velocity and relative position of transmitting site with respect to the receiving site. Transmitting site speed, direction, and position can be used in conjunction with receiving site speed, direction, and position to further refine the results of the invention.

In block 1020, the most recent transmitting site velocity is compared to the next most recent. This helps the system identify gross errors in velocity and or location determination. A weighted least squares algorithm, or a Kalman filter may be employed to help identify these gross errors.

In block 1030, the receiver alert system determines whether the transmitting site and the receiving site are approaching, diverging, or running parallel. If diverging or running parallel, control returns to block 800 to await another message. Otherwise control resumes in block 1040.

Figure 10:
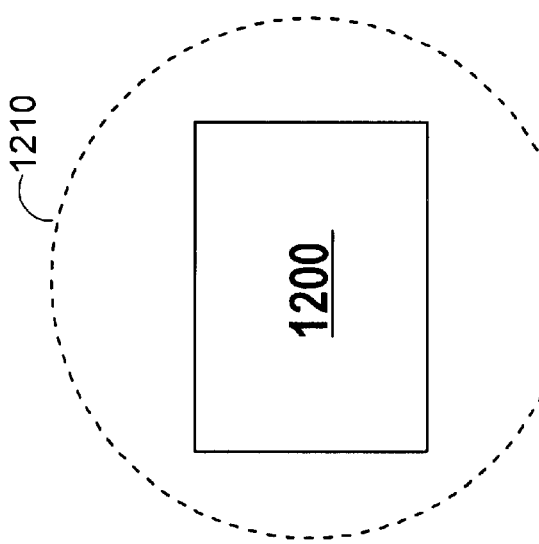
FIG. 10 is a diagram showing a zone of danger about a site.

In block 1040, the receiver alert system then determines whether the transmitting site and the receiving site will pass close enough to warrant an alert. This is further explained by FIG. 10.

In the preferred embodiment, the receiver alert system determines a safety zone 1210 for receiving site 1200. In the most simple sense, this would be a circle with a set radius around the receiving site, as diagramed in FIG. 10. In an alternative embodiment, this zone could be changed by two inputs.

Figure 11:
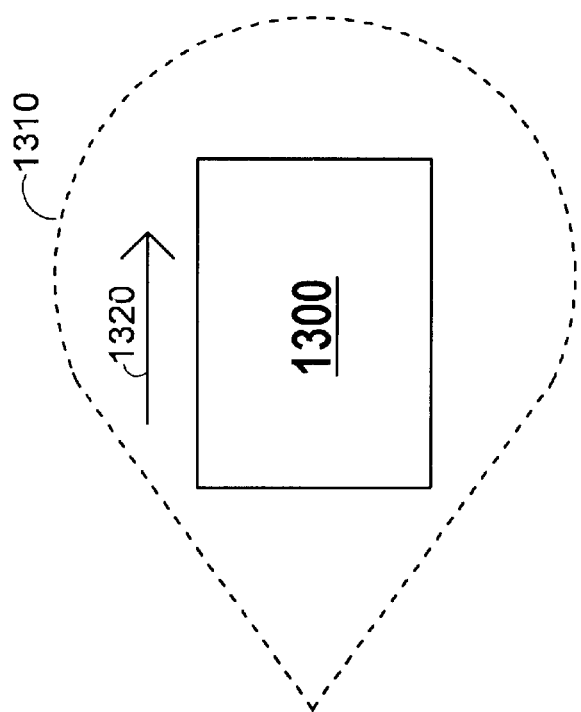
FIG. 11 is a diagram showing a zone of danger responsive to a parameter about the sight.

First, CPU 740 is connected to receiving site speed sensor 750. Site speed sensor 750 may have a digital output, or it could be sampled through amplifiers, filters, or analog to digital converters as shown in FIG. 7. Based on the speed of the receiving site, the safety zone 1310 would be extended in the motion of direction 1320 of receiving site 1300, as shown in FIG. 11.

Second, encoded signal 400 contains an alert status field 420, as explained previously. When set to a particular value, the receiving site could identify particular situations as being especially dangerous, Thus, if alert status field is set to a value indicating a high speed chase, the receiver alert system would recognize that an especially dangerous situation exists.

Figure 12:
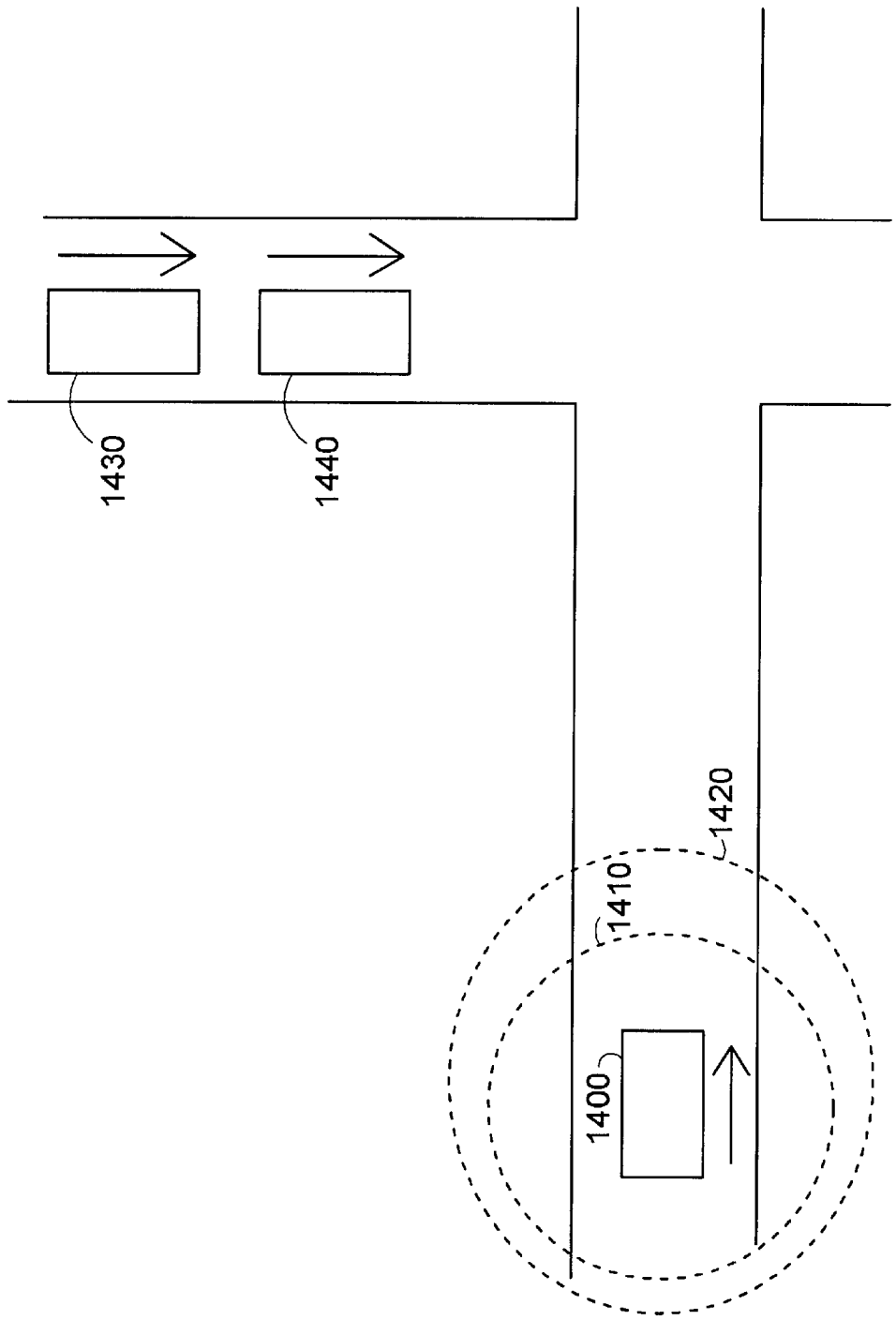
FIG. 12 is a diagram showing a highly dangerous situation, and the responsiveness of the invention to this highly dangerous situation

As shown in FIG. 12, receiving site has normal safety zone 1410. However, transmitting site 1430 is a law enforcement vehicle engaged in a high speed pursuit of another vehicle 1440. Vehicle 1430 has enabled emergency status control 390 to indicate this particularly dangerous situation. Thus, when the receiver alert system in site 1400 recognizes this status, the zone of safety for site 1400 is increased to zone 1420 with regards to site 1430.

Figure 13:
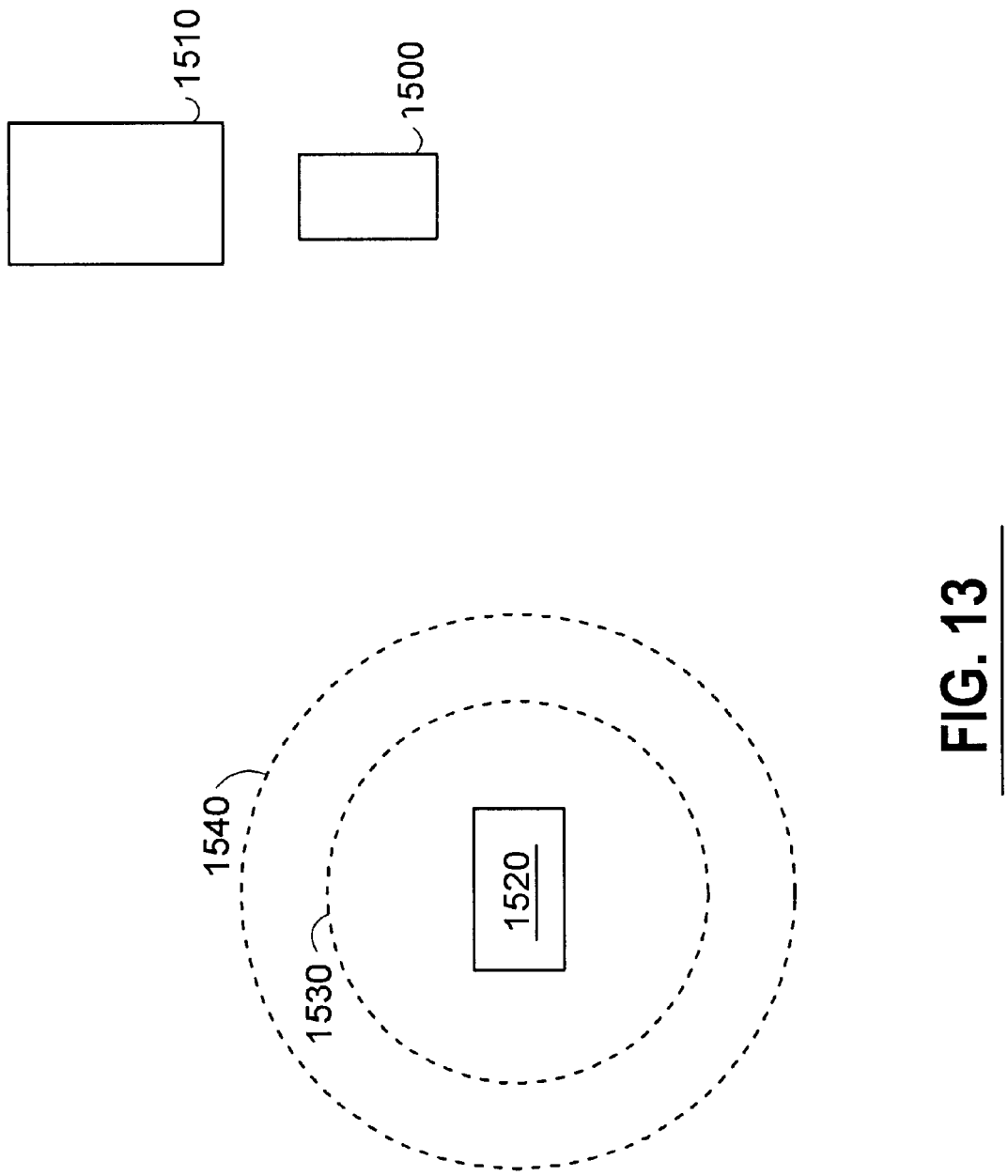
FIG. 13 is a diagram showing the invention used about a static transmitting sight and the responsiveness of the invention to this highly dangerous situation.

This could have wide application in stationary applications also. In FIG. 13, transmitting site 1500 is stationed at fire 1510 spewing toxic gases. An alert status could be broadcast from stationary transmitting site 1500 which would enlarge the zone of safety around receiving site 1520 from zone 1530 to zone 1540, such as a couple of miles. Thus the invention could be used to clear or warn sites out of the way of a highly dangerous stationary situation.

Figure 14:
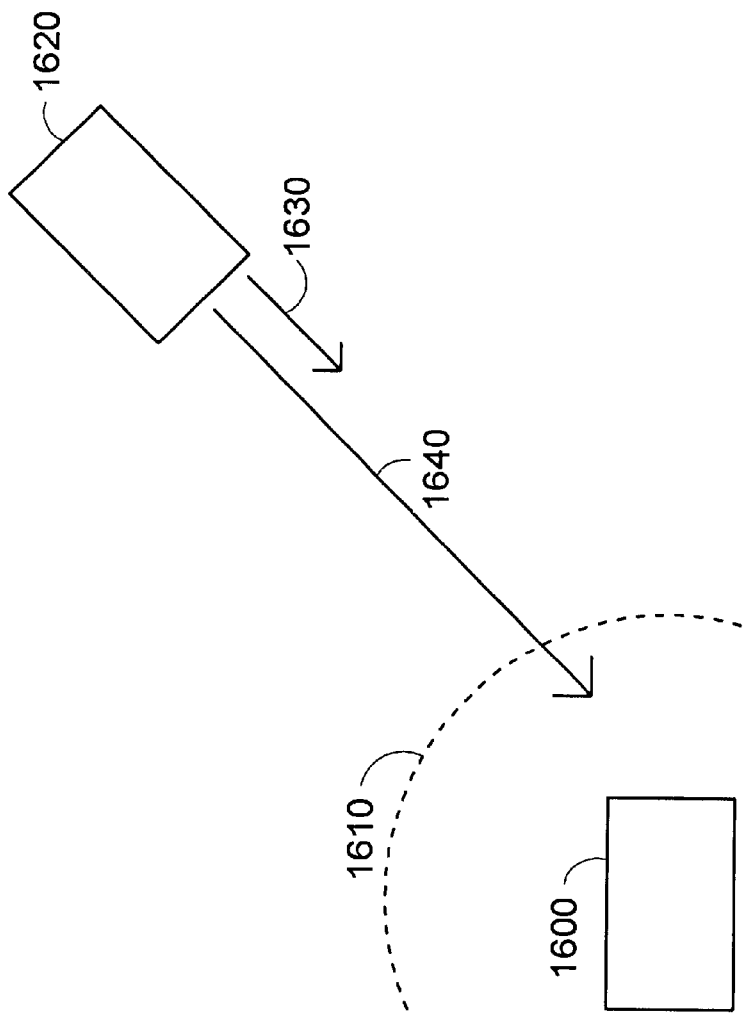
FIG. 14 is a diagram detailing how the invention determines a likelihood of danger to a transmitting site.

Alternatively, the current relative velocity of the transmitting site is extended out by a set amount of time. This is illustrated in FIG. 14. There, receiving site 1600 has a zone of safety 1610. Site 1620 is approaching with relative velocity 1630. Current relative velocity 1630 of site 1620 is extended out by a certain amount, resulting in velocity vector 1640. This extension of the current relative velocity 1630 would bring transmitting site 1620 within safety zone 1610 of receiving site 1600. In this situation, the receiver alert system would dictate that an alert be sounded at receiving site 1600.

Figure 15:
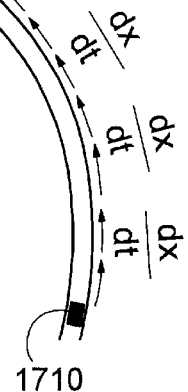
FIG. 15 details how the invention determines a trajectory of a transmitting site.

In an alternative embodiment, diagramed in FIG. 15, the relative velocity of the transmitting site is determined at numerous points relative to the receiving site. This collection of relative location—velocity points is tabulated and from them, an expected trajectory of transmitting site 1700 is determined. Thus, the receiver alert system can determine a possibility of danger based on the velocity measurements of the transmitting site, but also on the expected trajectory based on previous relative locations and velocities. This is shown in FIG. 15.

In FIG. 15, each instantaneous velocity is integrated with respect to time, yielding a change in position. Taking an average or these small changes in position over an interval Wn yields an average path for the interval Wn. The average taken over interval Wn should be of an exponential form, or weighted squares so that non-linear paths over Wn can be accurately represented. The changes over the intervals Wn, Wn-1, ... Wn-m can then be considered in another weighted or exponential average to determine the trajectory of transmitting site 1700 relative to receiving site 1710. Then a trajectory can be predicted for transmitting site 1700. This trajectory is compared to the zone of danger about receiving site 1710 for a determination if the possibility of danger exists to receiving site 1710. It should be noted that several methods exist for determining paths or trajectories, and any of these can be used in this determination of whether a dangerous situation should be alerted.

Figure 8:
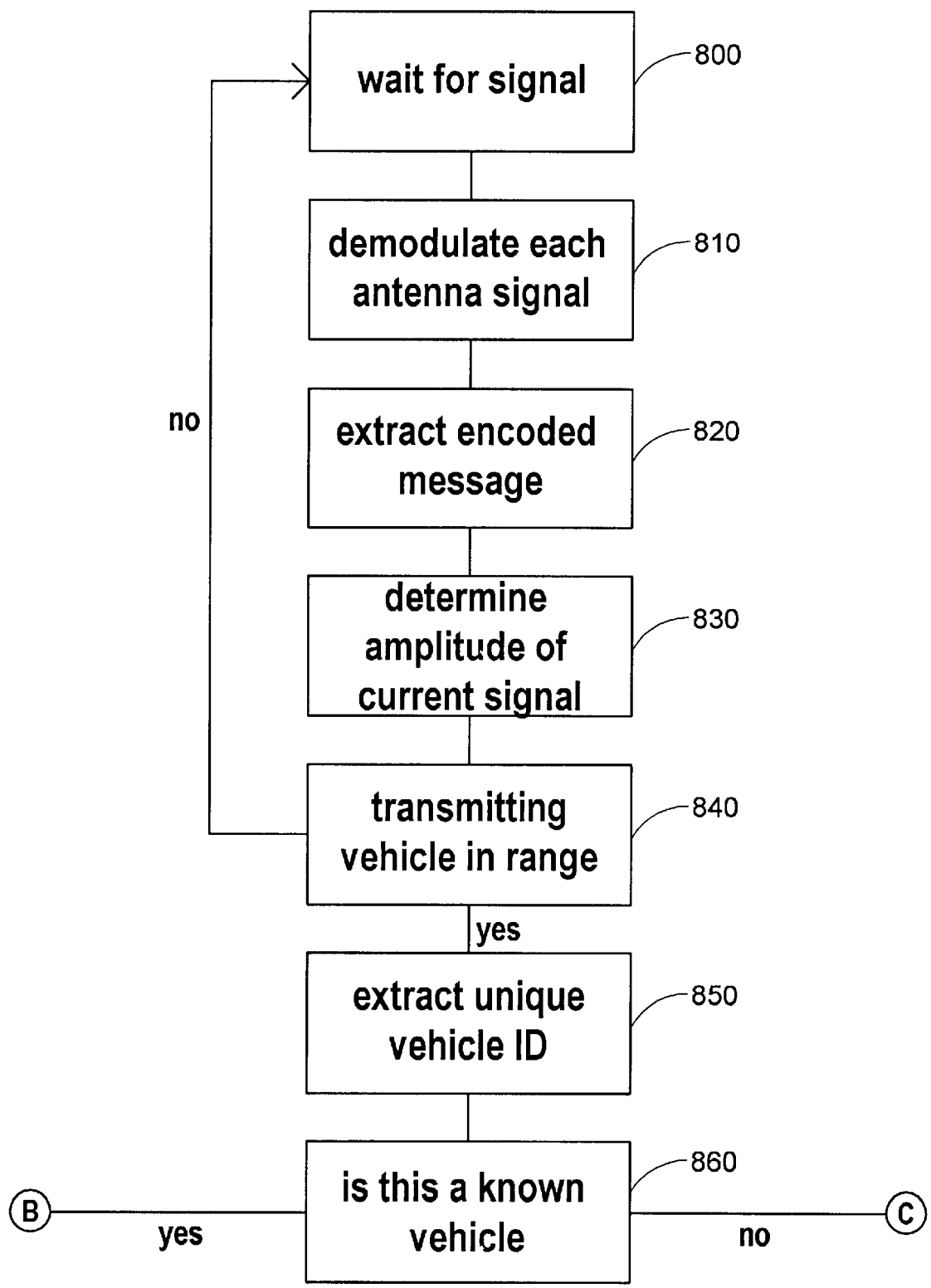
FIGS. 8–8b is a flow diagram of the operation of the receiver alert system.
Figure 8A:
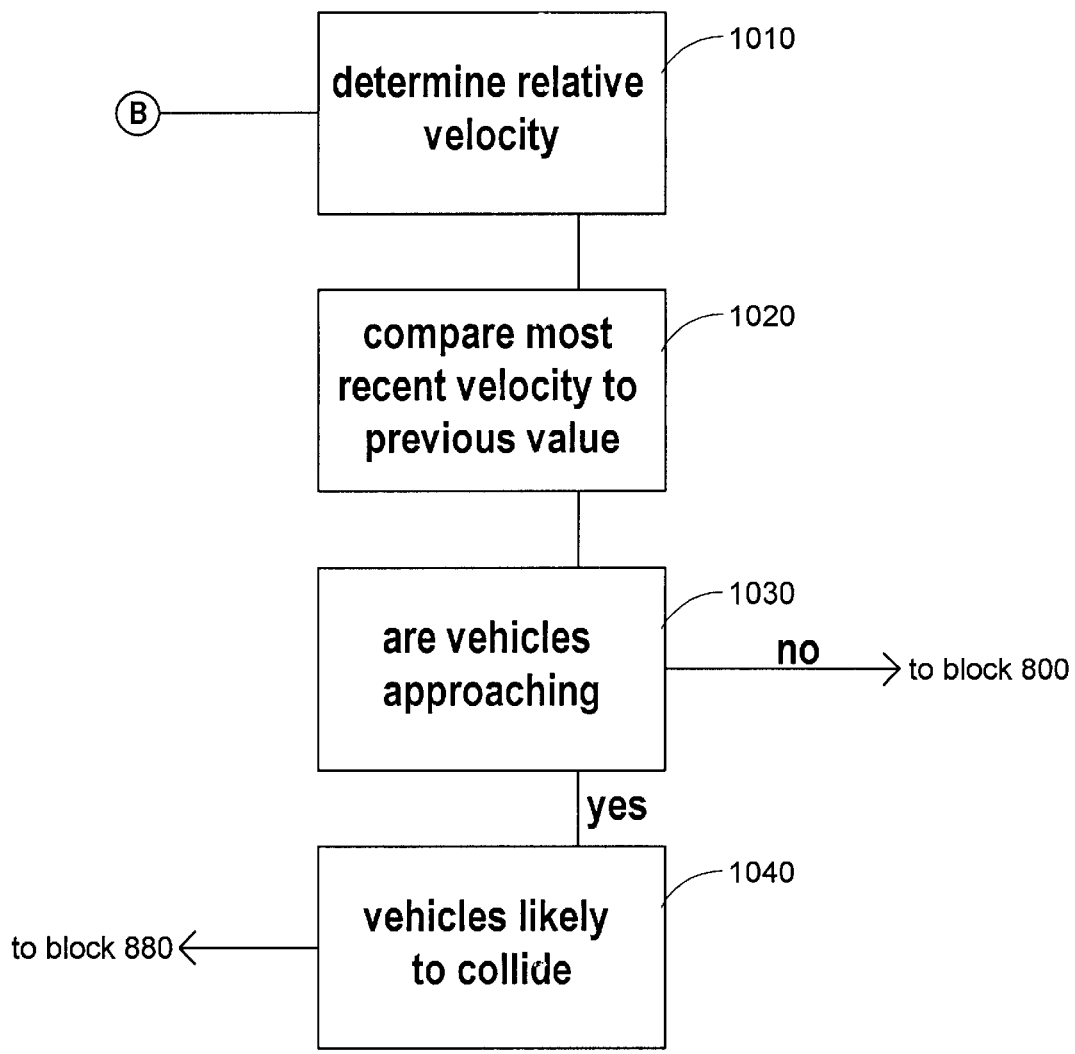
Figure 8B:
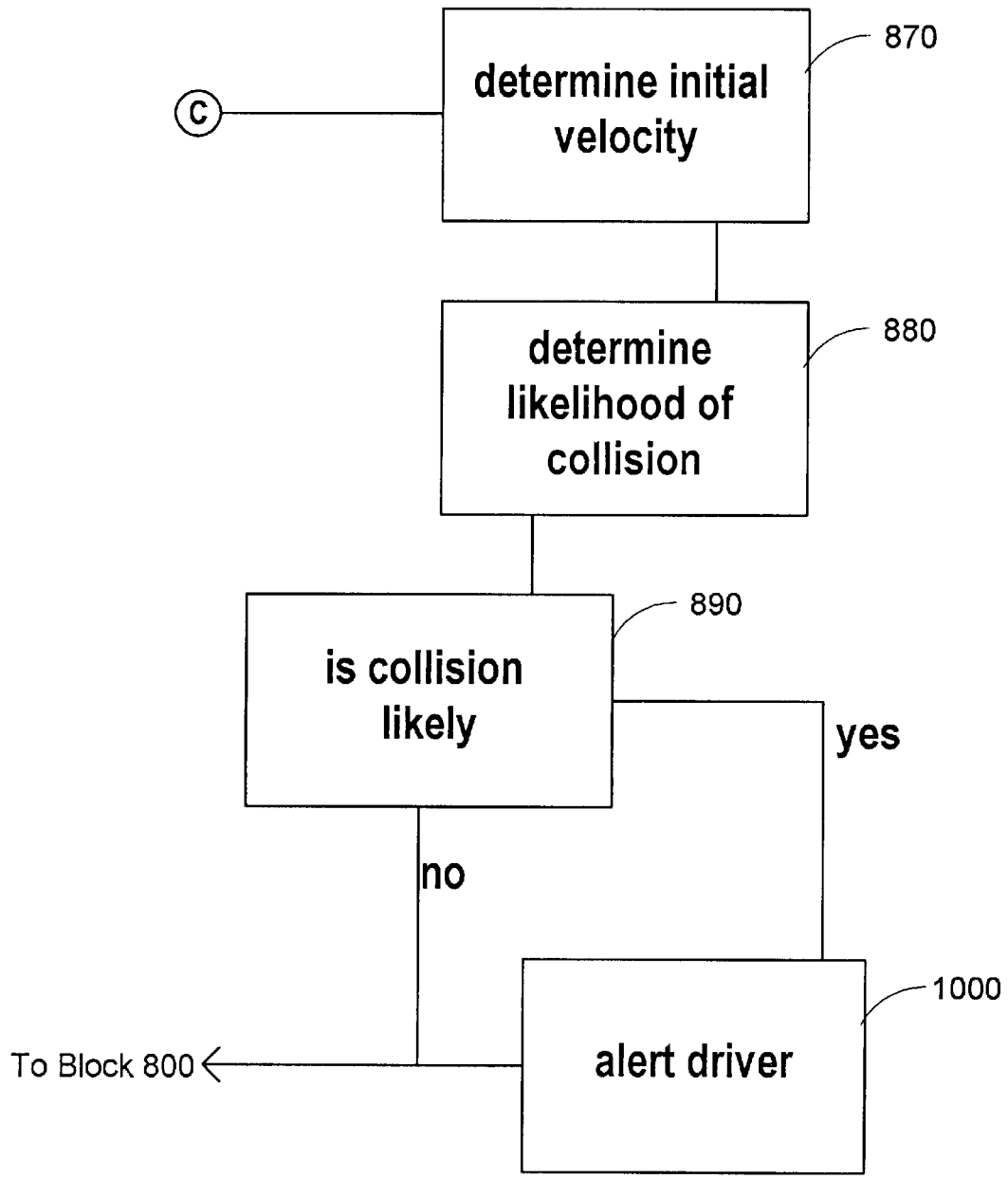

If an alert is not warranted, control returns to block 800 in FIG. 8. If an alert is warranted, control resumes in block 1050 where an alert is initiated.

It should be noted that in the embodiment described, one CPU performs many functions of the receiver alert system. It should be noted that several CPUs running simultaneously could perform these functions, and the invention is not limited to the sole CPU as described in preferred embodiment.

Turning back to FIG. 7, in the preferred embodiment, when the receiver alert system determines that an alert is necessary, it drives a signal to a digital output module 760. Digital output module 760 controls the operation of visual indication system 765. It should be noted that since the relative direction of the transmitting site is known, a series of visual alerts corresponding to compass directions would be employed to alert the receiving site as to the current direction of a transmitting site. In addition to the visual alerts, digital output module 760 can control an audio system 770, such as a car stereo, and an independent audio alert system 780. The methods of driving an audio or visual alert are well known in the art, and this invention contemplates using them.

It should be noted that numerous other methods of alerting the receiving site are possible, and the invention should be construed so as to accompany them. It should be noted that various modifications may be made in the nature, composition, operation and arrangement of the various elements, steps and procedures described herein without departing from the spirit and scope of the invention as defined in the following claims.

We claim:

1. A danger alert system comprising:
    a signal transmitter about a transmitting site for transmitting a signal;
    a receiver alert system about a receiving site for receiving the signal and determining the danger posed by the transmitting site, the receiver alert system comprising:
        at least one signal receptor adapted for receiving the signal;
        a velocity measurer connected to the signal receptors whereby a relative velocity of the transmitting site is determined from an analysis of the signal;
        a site locator connected to the signal receptors whereby a relative position of the transmitting site is determined from an analysis of the signal;
        a danger assessor connected to the signal receptors for assessing the danger between the transmitting site and the receiving site based on the relative position and relative velocity of the transmitting site to the receiving site.

2. The alert system of claim 1 wherein the receiver alert system further comprises an alert responsive to the danger assessor for alerting persons about the receiving site if the danger assessor determines a likelihood of danger represented by the transmitting site.

3. The alert system of claim 1 wherein the receiver alert system is carried by and adapted for use in a vehicle.

4. The alert system of claim 1 wherein the receiver alert system comprises a plurality of signal receptors.

5. The alert system of claim 1 wherein the signal is an electromagnetic signal.

6. The alert system of claim 5 wherein the signal is a radio frequency signal.

7. The alert system of claim 1 wherein the signal comprises a message.

8. The alert system of claim 7 wherein the message comprises a digital message.

9. The alert system of claim 7 wherein the transmitter further comprises an analog to digital converter.

10. The alert system of claim 7 wherein the message further comprises a unique site identification.

11. The alert system of claim 7, the transmitter further comprising a transmission power detector for detecting a signal transmission power of each transmitted signal.

12. The alert system of claim 11 wherein the message further comprises a transmission power value indicating the transmission power of a previously sent signal.

13. The alert system of claim 7 wherein the transmitter further comprises a variable gain control for controlling the output power of the transmitter in response to an operating parameter of the transmitting site.

14. The alert system of claim 13 wherein the operating parameter of the site is speed.

15. The alert system of claim 7 wherein message includes at least one timing mechanism.

16. The alert system of claim 15 wherein the timing mechanisms are spaced pulses.

17. The alert system of claim 7 the danger assessor further comprising a signal comparator for comparing the signal received at the signal receptors.

18. The alert system of claim 17 wherein a relative position of the transmitting site is determined at least in part by an output of the comparator.

19. The alert system of claim 17 wherein a relative velocity of the site is determined at least in part by an output of the comparator.

20. The alert system of claim 17 wherein the comparator compares a difference in time between signals received at a plurality of the signal receptors.

21. The alert system of claim 17 wherein the comparator compares a difference in phase between signals received at a plurality of the signal receptors.

22. The alert system of claim 17 wherein the comparator compares a difference in frequency between signals received at a plurality of the signal receptors.

23. The alert system of claim 17 wherein the comparator compares a difference in frequency between the signals received at a plurality of the signal receptors and an expected frequency.

24. The alert system of claim 17 wherein the comparator compares a difference in amplitude between previously received signals and a currently received signal.

25. The alert system of claim 17 wherein the comparator compares a difference in amplitude between a received signal and an amplitude value for the transmitted signal.

26. The alert system of claim 7 wherein the message comprises a site status value, whereby the probability of a likelihood of danger between the second vehicle and the site is responsive to the site status value.

27. The alert system of claim 1, the receiver alert system further comprising a sampler connected to the signal receptors, whereby a received signal is sampled for storage in digital form.

28. The alert system of claim 1, the receiver alert system further comprising at least one timer for timing the reception of the signal at least one of the signal receptors.

29. The alert system of claim 1 wherein the danger assessor determines if the transmitting site is within an operational range limit of the second vehicle.

30. The alert system of claim 1 wherein the danger assessor determines if the transmitting site and the receiving site are converging.

31. The alert system of claim 1 wherein the danger assessor determines if the transmitting site a zone of danger about the receiving site.

32. The alert system of claim 1 wherein the danger assessor is connected to a speed sensor indicating the speed of the receiving site, and the prediction of the likelihood of danger is based at least in part upon the speed of the receiving site.

33. The alert system of claim 1 wherein the receiver alert system comprises at least one central processing unit.

34. The alert system of claim 1 wherein the alert comprises an audible alert.

35. A method for alerting persons about a receiving site of a danger due to a transmitting site, the receiving site having an alert system, the method comprising:

receiving, at the alert system, a transmitted signal from the transmitting site, the alert system comprising a plurlality of signal receptors;

analyzing the signal;

determining a relative velocity of the transmitting site to the receiving site; and determining the danger of the transmitting site based on the analyzing or determining.

36. The method of claim 35 wherein the step of analyzing further comprises the step of:

extracting a message from the signal.

37. The method of claim 35 wherein the step of analyzing the signal further comprises the step of:

determining a relative position of the transmitting site.

* * * * *